United States Patent Office 3,434,235
Patented Mar. 25, 1969

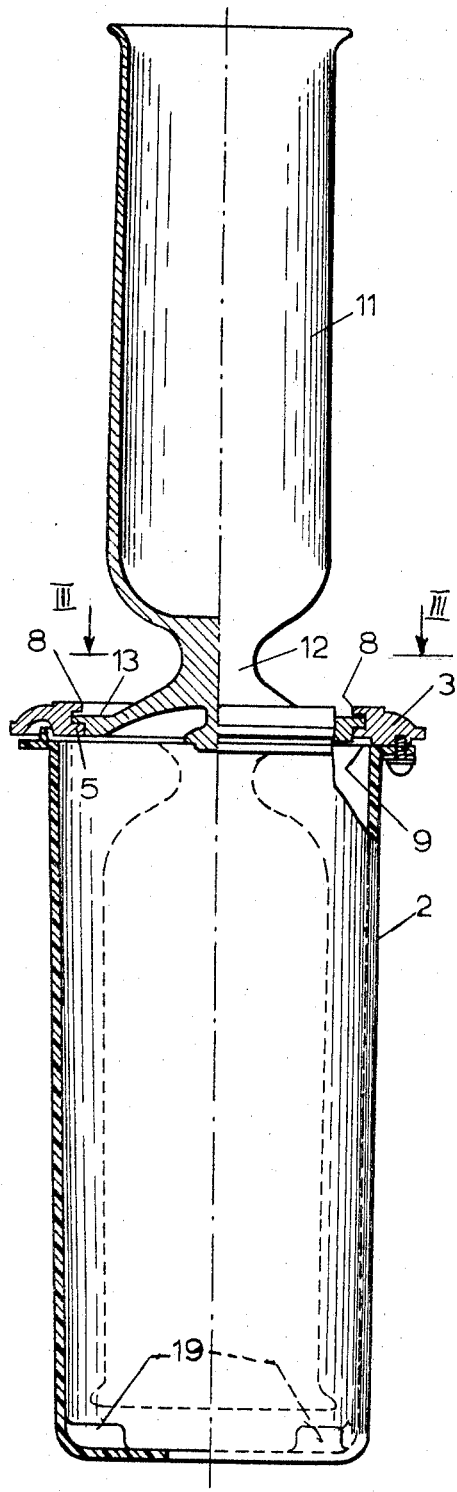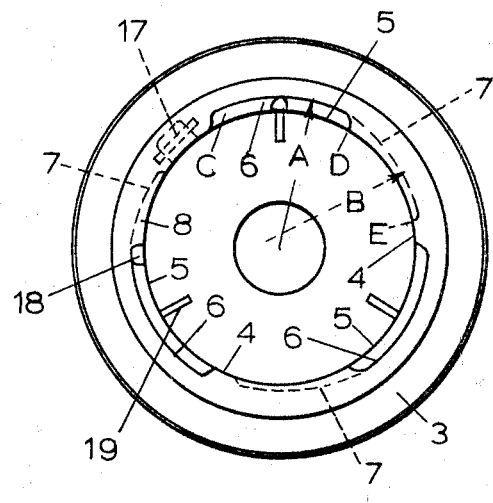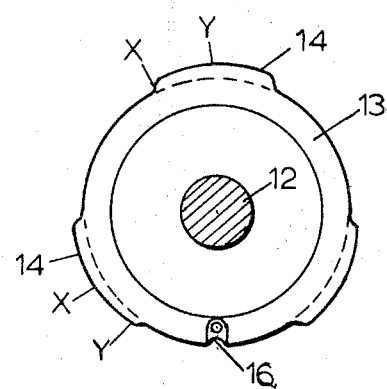

3,434,235
FLOWER VASE AND HOLDER
Robert G. Gordon and James C. Tweddell, Bethel Park, Pa., assignors to Jas. H. Matthews & Co., Pittsburgh, Pa., a corporation of Pennsylvania
Filed Mar. 24, 1967, Ser. No. 625,840
Int. Cl. A01g 5/00; A47g 7/07; B65d 25/24
U.S. Cl. 47—41.1                                      9 Claims

ABSTRACT OF THE DISCLOSURE

A flower vase and holder therefor, wherein the vase is securely maintained in the holder when in use by means of cooperating wedging surfaces.

---

This invention is for a flower vase and holder of the type sometimes known as a ground vase, since the holder is set in the ground, such vases being used principally in cemeteries.

Vases and holder assemblies are presently available, and the holder for the vase is usually a cylindrical receptacle that has a rim at the top. The holder is set just about level with the surface of the ground. Its depth is slightly greater than the height of the vase. The vase is artistically contoured with a base that cooperates with the rim in such manner that the vase, when holding flowers, sets erect on the rim. When it is not in use, the vase is inverted and hangs down into the holder with its base suspended from the rim, flush with the rim so that nothing projects to interfere with grass cutting or other necessary care. In some cases the construction is such that the vase is set down inside the holder in an upright position with the top of the vase close to the level of the rim, a position which is desirable with especially tall flowers.

The present invention is for a vase and holder of this kind and provides a novel arrangement on the base of the vase and the rim of the receptacle so provided with cooperating wedging surfaces as to firmly hold the base when it is in an upright position on the rim that it will remain upright and may not rotate by action of the wind or other cause to a position where it will fall over or wobble, but which, with slight manual effort, may be released. When the vase is inverted the arrangement is desirably such that the camming or wedge surfaces on the base and rim are ineffective so that the vase can be easily lifted out when it is to be next used. The invention eliminates a frequent source of annoyance encountered in present constructions by reason of foreign matter lodging between the base and an overhang on the rim in such manner that it is difficult to release the vase from its upright position when it is to be inverted, or, as is more often the case, interfering with releasing the vase when it is inverted to return it to the upright position.

Aside from the more firm manner in which the vase is held in the upright position by the cooperating wedging action of the base and rim in the present invention, and the elimination by the present invention of foreign matter interfering with inverting or turning the vase upright as above described, the invention simplifies manufacture, particularly in the parts being more readily cast with less intricate patterns.

The invention may be understood by reference to the accompanying drawings and showing an embodiment of the invention. In the drawings:

FIG. 1 is a view partly in side elevation and partly in vertical section showing the vase in upright position, with its outline in inverted position being shown in dotted lines;

FIG. 2 is a top plan view of the holder with the vase completely removed;

FIG. 3 is a transverse horizontal section through the vase just above the base in the plane of line III—III of FIG. 1, showing the shape of the base;

Figure 4:
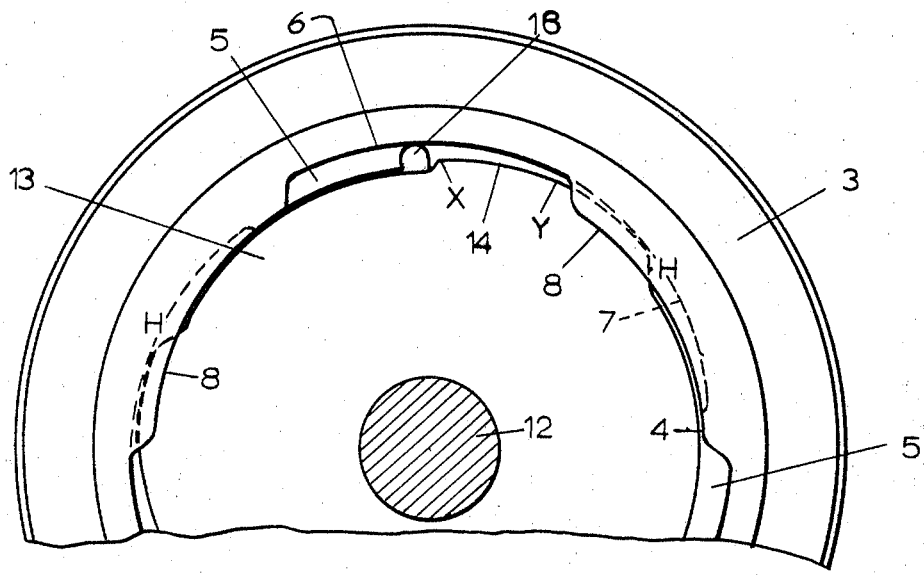
FIG. 4 is a fragmentary section similar to FIG. 3 on a larger scale than FIG. 3 and showing the base of the vase setting on the holder in the locked position.
Figure 5:
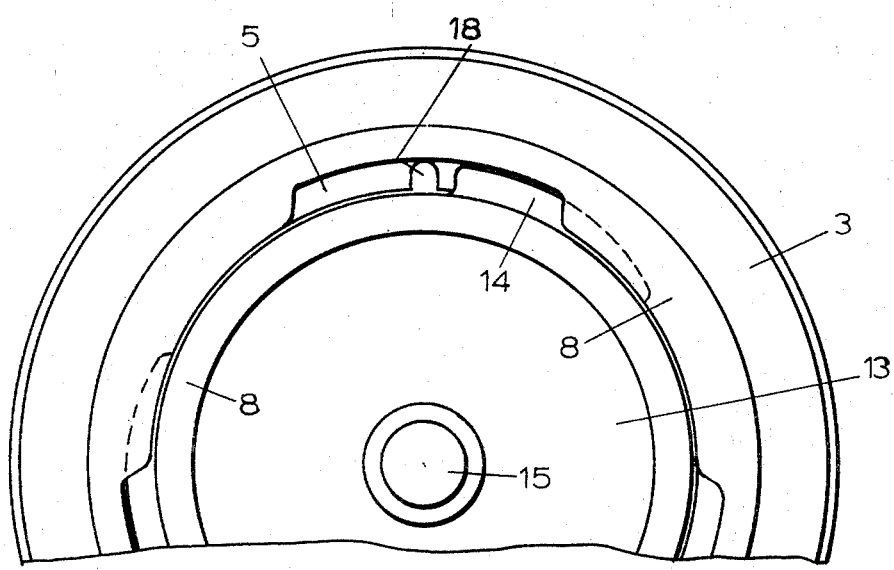
FIG. 5 is a fragmentary top plan view of the holder with the vase inverted.

In the drawings the holder comprises a container designated 2, which is a generally cylindrical vessel designed to be set into the earth or into concrete. It has an annular rim portion 3 at the top that is about flush with ground level, and is the only part of the holder that is visible when the holder is set in the earth. In the particular unit here shown, the rim is wide enough to overhang both the outside and inside of the cylindrical wall of the holder.

The rim 3 is formed with a countersunk ledge on its interior periphery, with radially-positioned stops at 4. Preferably the ledge is discontinuous, being divided into a plurality of segments 5 equally spaced and of equal arcuate length. Three such portions are usually provided, but there could be a single ledge portion or a plurality. In any case there must be at least one. There is a substantially vertical shoulder 6 at the outer boundary of each ledge portion 5 that is concentric about the center of the annulus 3, being formed about a radius A. At the end of each ledge portion the shoulder continues around the annulus to one of the stops 4, but this portion of the shoulder, designated 7, is curved about a different radius B so as to curve or gradually angle inwardly from the shoulder 6 toward the center of the inner periphery or center of the annular rim.

Figure 6:
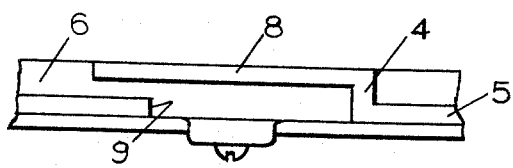
FIG. 6 is a fragmentary elevation of a portion of the rim looking outwardly from the center.

It may be explained that each ledge portion 5 could extend the full distance from one stop 4 to the next, but it facilitates casting and makes the ledge practically self-cleaning by having it terminate about where the wall or shoulder starts to curve inwardly. The arc C–D is the span of the concentric portion of the shoulder, and D–E the portion that curves or angles inwardly. There are lip portions 8 on the rim projecting inwardly to overhang the shoulder portion 7 in a plane spaced above the level of the top of the ledge portions, and they may overhang the ends of the ledge portions themselves near those ends 9 of the ledge portions nearest the inwardly-curved shoulder portions 7, as shown in FIG. 6.

The vase has a cup or flower holder portion 11 that has an overall diameter less than the minimum internal diameter of the rim. It is here shown with a short neck portion 12 at the bottom of the flower holder, and on the bottom of this is a base 13. The base 13 has a plurality of equally-spaced similar lugs 14 projecting radially therefrom, three such lugs being provided for use where the rim has three segmental ledge portions 5. The lugs are of an arcuate width at their outer ends somewhat less than the arcuate span of the ledge 5 between C and D, and less in arcuate length than the exposed span of each ledge not covered by the over-hanging lip 8. The diameter of the base between the lugs is less, preferably only slightly less, than the minimum internal diameter of the rim, while the lugs project from the base a maximum distance equal to radius A of the rim. This is so that when the vase is set on the rim of the holder, the lugs will rest on the ledge portions 5 with only a working clearance between the outermost portion of the lug and the shoulder 6. It will be noted that each lug has a portion between X–Y that is of diminishing radius, or which angles inwardly away from the shoulder when the vase is on the rim in upright position. This portion is so located that when the vase is upright on the rim, it is at that portion of the periphery of the lug most remote from the inwardly-curved portion 7 of the shoulder. The lugs have a thickness such that they have only a free working fit in the space between the ledge and the under surface of the lip 8.

As is customary in vases of this kind, the bottom of the vase has a central button or knob 15 thereon. Also, a chain (not shown) is hooked into a notched eye portion 16 at the periphery of the base and around a cross bar 17 in the rim to prevent the vase from being carried away.

In the particular construction shown, the vase with its stem and base are integral. The container part of the holder is formed mainly of plastic, with the rim being formed of metal and being attached to the top of the plastic container by screws which are inaccessible after the holder is set into the ground. However, the rim and holder may be formed integral.

When the vase is to be set on the rim to stand above ground to hold flowers, it is placed on the rim with the lugs 14 resting on the exposed portions of the ledge, e.g., ledges 5. Then the vase is turned, in this case clockwise, so that the lugs enter between the overhanging lip 8 and the ledge. This confines the vase from tipping over. As the turning continues, the lug wedges against the shoulder 7 where the shoulder angles inwardly, and this wedging prevents the vase from being turned through the full arcuate length of the ledges. When so turned and wedged, the vase is held against free turning in the wind or by vibration to a position where the lugs are not confined by the overhanging lips. The terminals 9 of the ledge portions are so positioned that the wedging will take place before the lugs can ride in a clockwise direction to a position where the ledge does not provide adequate support. In other words, the lug cannot come against the stops 4, and a substantial portion of their width may not be positioned under the overhanging lips when the vase is thus held from free turning.

When the vase is not in use, it must be inverted so as to hang from the rim down into the holder, which is of a depth necessary to receive it. When the vase is so inverted, the noncircular peripheral edge of the lugs enables the vase to be turned until the leading edge of the lugs abut against the partitions 4 without any wedging taking place. If it were not for this noncircular contour of the periphery of at least a portion of the lugs, the lugs would wedge against the shoulders 7 the same as when the vase is upright, and since the knob 15 gives little leverage for turning the inverted base, it would be difficult to release the vase to again turn it to an upright position.

Sometimes it is desirable that the vase be set upright on the bottom of the holder instead of on the rim. To enable this to be done, a radial notch 18 is desirably formed in one of the ledges extending from its inner periphery to the shoulder 6. With three lugs on the base, no two of them are diametrically opposite, and the maximum diameter of the base is the diameter of the base plus the radial projection of one lug beyond the base. By turning the vase horizontally, the base of the vase, being then vertical, can be passed through the rim with the notch 18 providing clearance for the lug. After the base has been thus passed through the rim, the vase is turned upright and lowered into the holder, coming to rest at the bottom of the holder with its top edge about flush with the rim. The bottom of the holder has a drain hole therein, and there are radial ribs 19 on which the vase is supported in spaced relation to the bottom when the vase is used in this manner.

According to the invention, therefore, there is provided a holder with an annular rim and a vase with a base, the base having radially-projecting lugs that engage ledge elements on the base with cooperating wedging surfaces on the rim and lugs that are rendered effective to bind the vase against free turning when the vase is set upright on the rim and turned to bring the wedging surfaces into engagement, but which wedging action does not occur when the vase is inverted and suspended from the rim. Also when the vase is upright on the rim, it is restrained from tipping over by overhanging lip elements on the rim. The arrangement does not involve the combined turning and vertical movement of the vase on the rim, as is necessary in widely used devices presently available, so that the vase cannot become jammed by dirt or foreign matter getting lodged between the rim and base of the vase to interfere with or prevent this vertical movement required in other assemblies. When the vase in either upright or inverted position is turned in a clockwise direction, the lugs will push foreign matter on the ledges toward and over the ledge terminals 9.

The vase and holder are here shown as single units, but frequently the holder forms part of a memorial slab, and the invention comprehends such an arrangement when the holder is part of the entire memorial.

While we have shown and described one embodiment of our invention in detail, it will be understood that various changes and modifications may be made in the parts within the concept of our invention and under the scope of the following claims.

We claim:

1. A vase and holder combination wherein the vase may be in an upright position on the holder or hang in an inverted position in the holder, the holder having an annular rim with countersunk ledge portions on the inner periphery, the vase having a base with a number of radially-projecting lugs thereon, the lugs being of less arcuate extent at their peripheries than the arcuate length of the ledges, the lugs being arranged to extend over and set on the ledge when the vase is in either upright or inverted position, and cooperating wedging surfaces on the rim and base which mutually converge when the vase is upright and which are effective to frictionally bind the base against free turning of the vase on the rim when the vase is rotated in one direction to an arc less than the arcuate extent of the ledges when the vase is in upright position on the rim to bring the converging surfaces into contact, said rim having lips of less arcuate extent than the lugs so positioned as to extend over the lugs when said wedging surfaces are engaged to hold the vase against free turning.

2. A vase and holder combination as defined in claim 1 wherein said wedging surfaces are so arranged as to be ineffective to bind the vase against free turning when the vase is on the rim in an inverted position when the wedge surfaces are then mutually divergent.

3. A vase and holder combination as defined in claim 1 wherein said ledges are formed with a shoulder along their outer peripheries, which are eccentric to the center of the annular rim to form surfaces against which the lugs may frictionally bind when the upright vase resting on said ledges is rotated relative to the annulus.

4. A vase and holder combination as defined in claim 3 in which the said peripheral shoulder around the ledge angles inwardly toward the center of the rim and the periphery of each lug angles inwardly away from the shoulder when the vase is on the rim in upright position.

5. A vase and holder combination as defined in claim 4 wherein one of said ledges has a radial notch therein extending from the inner periphery of the ledge to the said shoulder and of a width such that a lug on the vase when the base is turned edgewise may pass therethrough, the base being of a diameter between the lugs less than the internal diameter of the annular rim.

6. A vase holder designed to be set in the earth comprising a container having a rim at the top designed to be set at ground level, said rim comprising an annulus having a plurality of countersunk ledge portions around its inner periphery with a substantially vertical shoulder at the outer boundary of each ledge, said ledge portions being arranged to support a radial lug projecting from the base of a vase which it is designed to hold, the rim having lips thereon at a level spaced above the level of the ledge portions and so positioned that the greater portion of the ledge portion is clear of the overhanging lips whereby the lugs of the vase to be used with the holder may be set on the ledge portion clear of the overhanging lip and then turned to a position where they extend at least partially under the lip, the rim having a vertical shoulder thereabout around the outer periphery of the ledges and under the overhanging lip, said portion of the shoulder under the lip curving in toward the inner periphery of the rim.

7. A vase for use on an embedded container which has a rim at the top with countersunk ledge portions at intervals around its inner periphery, which ledge portions have a substantially vertical wall forming their outer boundary, the rim having overhanging lips thereon projecting at a level above the ledge portions so positioned that a substantial part of the ledge portions is uncovered, said vase having a vessel of a diameter to pass in an inverted position through the rim, and a base with radially-extending lugs corresponding in number to the number of ledge portions on the rim, said lugs being of an arcuate width at their outer ends less than open parts of the ledge portions of the rim, and of a thickness to fit between the under surface of the lips on the rim and the top of the ledge, said lugs having a peripheral surface which is curved inwardly toward the center of the vase, the lugs having a maximum projection beyond the base such that the vase may be set on the ledge portions of the rim with the lugs substantially contacting said vertical shoulder and said inwardly-curved periphery angling away from said shoulder.

8. A vase and holder combination wherein the vase may be in an upright position in the holder or be suspended in the holder in an inverted position, the holder having an annular rim with at least one depressed ledge portion on its inner periphery, the vase having a base portion with at least one lug projecting radially therefrom, the lug being arranged to extend over and rest on the ledge portion of the rim to support the vase in either its upright or inverted position, the lug being of less arcuate extent than the ledge portion whereby the vase may be rotated on the rim through a limited arc, and cooperating wedging surfaces on the rim and lug which are mutually convergent when the base is upright and which are effective to frictionally bind the base against free rotation on the ledge when the vase is in an upright position on the rim and it is rotated in a direction to bring said wedging surfaces into engagement, the rim having a lip thereon of less arcuate extent than the ledge positioned to overhang the lug on the base when the vase is rotated to bring the wedge surfaces into binding engagement.

9. A vase and holder combination as defined in claim 8 in which the cooperating wedging surfaces on the lug and rim are so arranged as to be ineffective to bind the vase against rotation on the rim when the vase is suspended from the rim in an inverted position.

References Cited

UNITED STATES PATENTS

| 2,488,924 | 11/1949 | Meierjohan et al. | 47—41.1 |
| 3,229,948 | 1/1966 | King | 47—41.1 XR |
| 3,377,043 | 4/1968 | King | 47—41.1 XR |

ROBERT E. BAGWILL, *Primary Examiner.*

U.S. Cl. X.R.

248—346; 220—18